United States Patent [19]
Barton et al.

[11] 3,833,826
[45] Sept. 3, 1974

[54] GAS-COOLED DYNAMOELECTRIC MACHINE

[75] Inventors: Sterling C. Barton, Scotia; James B. Archibald; Robert W. Albright, both of Schenectady, all of N.Y.

[73] Assignee: General Electric Company, Schenectady, N.Y.

[22] Filed: June 21, 1973

[21] Appl. No.: 372,052

[52] U.S. Cl. .................................. 310/52, 310/64
[51] Int. Cl. ............................................. H02k 9/14
[58] Field of Search ............ 310/57, 55, 58, 59, 64, 310/65, 52, 53, 62, 64

[56] References Cited
UNITED STATES PATENTS

| | | | |
|---|---|---|---|
| 2,186,232 | 1/1940 | Baudry | 310/55 |
| 2,427,702 | 9/1947 | Baudry | 310/57 |
| 2,650,994 | 9/1953 | Bahn | 310/57 |
| 2,717,320 | 9/1955 | Shoulders et al. | 310/57 |
| 2,742,582 | 4/1956 | Bahn et al. | 310/55 X |
| 3,348,081 | 10/1967 | Willyoung | 310/55 |
| 3,439,202 | 4/1969 | Wanke | 310/55 X |
| 3,461,329 | 8/1969 | Shartrand et al. | 310/55 |
| 3,588,556 | 6/1971 | Guzman et al. | 310/58 |
| 3,652,881 | 3/1972 | Albright et al. | 310/57 |
| 3,714,478 | 1/1973 | De Mania et al. | 310/57 X |

*Primary Examiner*—J. D. Miller
*Assistant Examiner*—Patrick R. Salce
*Attorney, Agent, or Firm*—John F. Ahern; James W. Mitchell

[57] ABSTRACT

A dynamoelectric machine with a mid-frame section and an end-frame section has manifold means comprised of a mid-frame manifold and an end-frame manifold, each sealingly connected to the respective frame sections. A gas-carrying transition means for conveying cooling gas between the manifolds is sealingly connected to the manifold means. Sealing rails facilitate the attachment of the gas-carrying transition means to the manifold means and reduce the overall space occupied by the dynamoelectric machine.

5 Claims, 4 Drawing Figures

3,833,826

MID FRAME  10  END FRAME

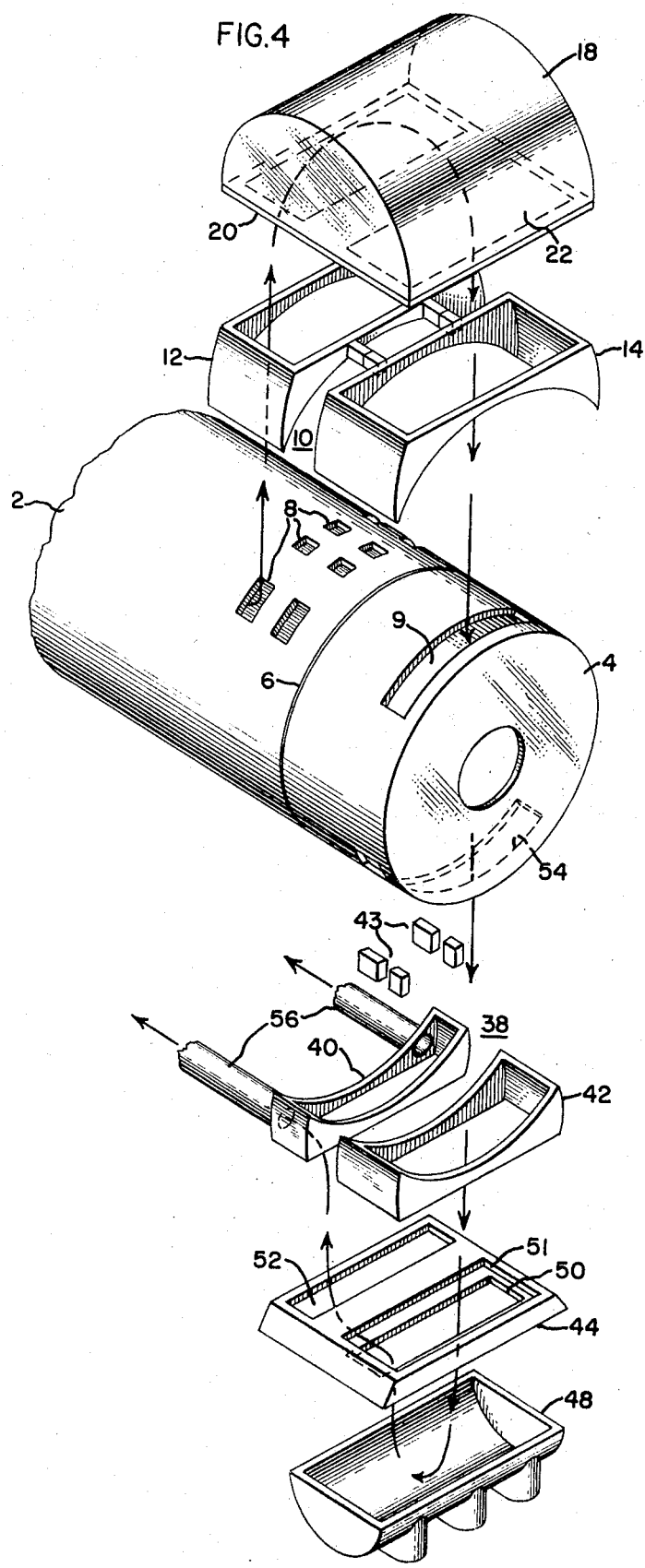

GAS-COOLED DYNAMOELECTRIC MACHINE

BACKGROUND OF THE INVENTION

1. Field of the Invention

This invention relates to gas-cooled dynamoelectric machines, and more particularly to an improved structure for conveying cooling gas through such a machine.

2. Description of the Prior Art

The prior art discloses gas-cooled dynamoelectric machines in which cooling gas, such as hydrogen, is conveyed from the interior of the machine, where the cooling gas absorbs heat from the machine's components, to the exterior of the machine, where the cooling gas is passed over a heat exchanger to recool the cooling gas, before recycling the same through the interior of the machine. Such an arrangement is shown in U.S. Pat. No. 3,652,881 issued to Albright et al., and assigned to the assignee of the present invention. The patent issued to Albright et al discloses a type of cooling structure for use with a dynamoelectric machine having a unitary or one-piece frame.

However, it is often desirable to make the frame of a dynamoelectric machine in more than one piece in order to facilitate handling, especially when shipping the machine. By constructing the frame of the dynamoelectric machine in more than one piece, it may be shipped while disassembled, thus occupying less space and reducing shipping charges. When the machine reaches its destination, it may be assembled on site. It is also desirable to provide a path for cooling gas which includes conveying the cooling gas external to the machine, as is shown in the aforementioned patent issued to Albright et al. By its nature, the structure for conveying cooling gas externally of the dynamoelectric machine shown by the Albright et al patent will be suitable only for use with a machine having an integral or one-piece frame.

The present invention enables cooling gas to be conveyed externally of a dynamoelectric machine frame while allowing the frame to be made in sections. Accordingly, a mid-frame and an end-frame section of a machine frame have manifold means, comprising a mid-frame and an end-frame manifold, each sealingly connected to the respective frame sections. A gas-carrying transition means is then sealingly connected to the manifold means. In accordance with the present invention, the gas-carrying transition means contains a heat exchanger for recooling the cooling gas as it is cycled through the machine by a fan means. The present invention also expands the function of the gas-carrying transition means to include its use for conveying cooling gas to external components, such as an electrical terminal box, associated with the dynamoelectric machine.

SUMMARY OF THE INVENTION

It is a general object of this invention to provide new and improved apparatus for conveying cooling gas through a gas-cooled dynamoelectric machine.

It is another object of the invention to provide an improved cooling apparatus for a multisection frame dynamoelectric machine in which cooling gas is conveyed externally of the machine.

It is a further object of the invention to provide a new and improved structure for cooling a dynamoelectric machine including mid-frame and end-frame sections, manifold means comprised of manifolds associated with the respective frame sections, and a gas-carrying transition means, sealingly connected to the manifold means, for conveying cooling gas between the manifolds.

In a first embodiment utilizing the invention, a mid-frame manifold is sealingly connected to a mid-frame section of the dynamoelectric machine and an end-frame manifold is sealingly connected to an end-frame section of the machine. A gas-carrying transition means conveys cooling gas between the manifolds.

In a second embodiment, a second mid-frame manifold and a second end-frame manifold with a second gas-carrying transition means is provided in addition to the structure utilized in said first embodiment.

BRIEF DESCRIPTION OF THE DRAWING

FIG. 4 is an exploded isometric view of a second embodiment of the present invention.

DETAILED DESCRIPTION OF THE INVENTION

Figure 1:
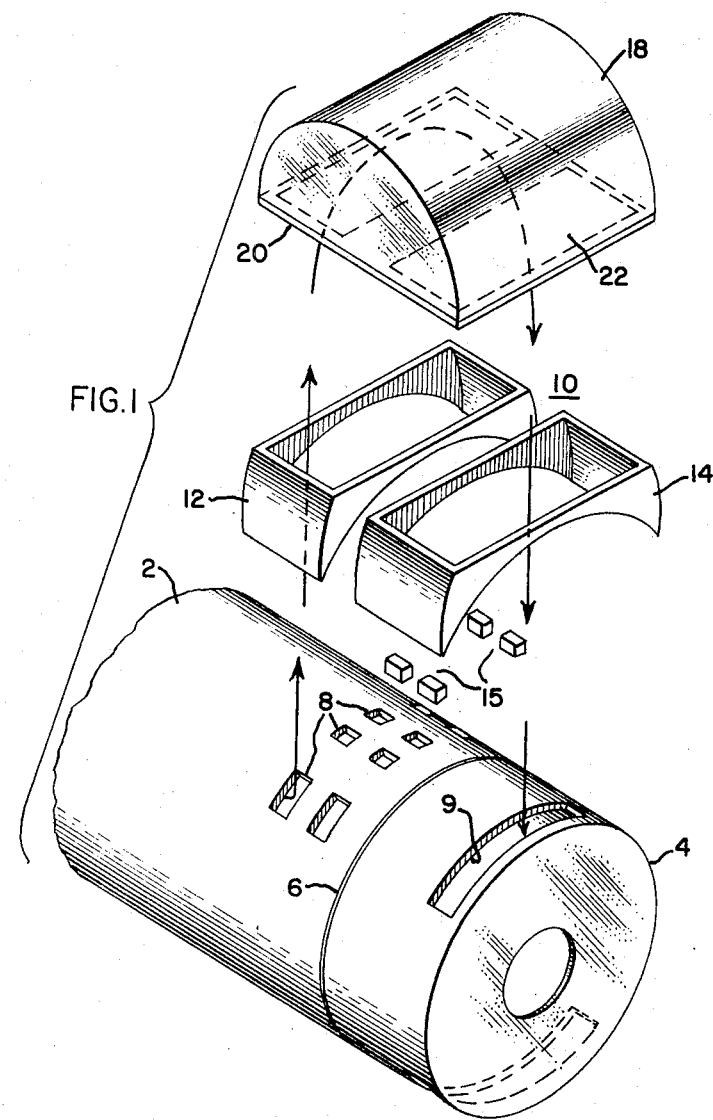
FIG. 1 is an exploded isometric view of a first embodiment of the present invention.

Referring to FIG. 1, a portion of a frame for a dynamoelectric machine, comprising a mid-frame section 2 and an end-frame section 4, is shown. The mid-frame and end-frame sections are sealingly connected to one another at a joint 6. Apertures 8 and 9 are provided in the mid-frame and end-frame sections, respectively.

Manifold means 10 is formed of a mid-frame manifold 12 and an end-frame manifold 14 and sealing rails 15. In actual use, mid-frame manifold 12 is sealingly connected about the perimeter of one open end thereof to mid-frame section 2 and end-frame manifold 14 is sealingly connected about the perimeter of one open end thereof to end-frame section 4. Mid-frame manifold 12 surrounds apertures 8 and end-frame manifold 14 surrounds aperture 9.

A gas-carrying transition means 18, wherein a heat exchanger is disposed (not shown for clarity), conveys gas between mid-frame manifold 12 and end-frame manifold 14. Gas-carrying transition means 18 has apertures 20 and 22 therein. Transition means 18 is sealingly connected to manifold means 10 with apertures 20 and 22 in communication with the mid-frame and end-frame manifolds, 12 and 14, respectively.

Figure 2:
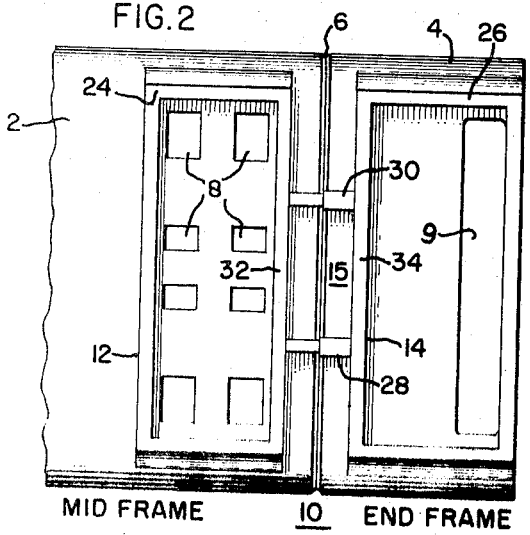
FIG. 2 is a top view of part of a dynamoelectric machine showing a mid-frame section and an end-frame section and a manifold means.
Figure 3:
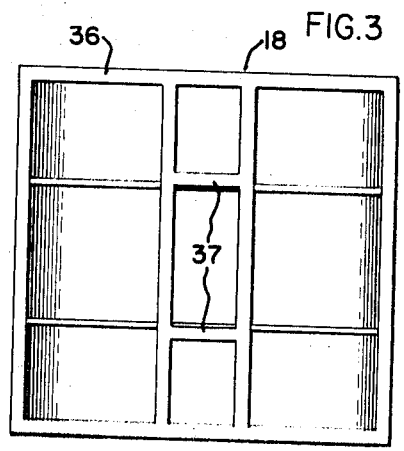
FIG. 3 is a bottom view of a gas-carrying transition means.

Referring now to FIGS. 2 and 3, the details of the connection between manifold means 10 and gas-carrying transition means 18 are seen.

Referring to FIG. 2, a top view of manifold means 10 is shown. Mid-frame manifold 12 and end-frame manifold 14 are mounted to mid-frame section 2 and end-frame section 4, encircling apertures 8 and 9, respectively. Top periphery 24 of mid-frame manifold 12 and top periphery 26 of end-frame manifold 14 provide a surface for accepting gas-carrying transition means 18. Manifold means 10 includes sealing rails 15 which effect a lowering of the height of the mid-frame and end-frame manifolds necessary to make the connection to gas-carrying transition means 18. Sealing rails 15 comprise members 28 and 30 which extend axially along frame sections 2 and 4 and connect to span joint 6. The sealing rails are sealingly connected to end-frame manifold 12 and mid-frame manifold 14 and to mid-frame section 2 and end-frame section 4. Sealing rails 15 allow the heights of the manifolds to be lowered because they obviate the necessity for providing a sealing surface for gas-carrying transition means 18 at portions 32 and 34 of peripheries 24 and 26. Since access to portions 32 and 34 is restricted unless manifolds 12 and 14 are made high enough to provide sufficient clearance, sealing rails 15 allow manifolds 12 and 14 to be made lower than would be possible without the use of sealing rails.

Referring to FIG. 3 in detail, a bottom view of gas-carrying transition means 18 is shown. Periphery 36 of gas-carrying transition means 18 is constructed to mate with manifold means 10, with portions 37 of periphery 36 mating with members 28 and 30. It is, of course, understood that if the manifolds 12 and 14 are made higher, portions 37 of periphery 36 could be omitted since the need for sealing rails 15 is thereby eliminated.

Referring now to FIG. 4, a second embodiment of the invention is shown. Second manifold means 38 is comprised of a second mid-frame manifold 40, a second-end frame manifold 42, and sealing rails 43. A second gas-carrying transition means 44 is sealingly connected to second manifold means 38 in a manner similar to that used to sealingly connect gas-carrying transition means 18 to manifold means 10. Sealing rails 43 are used in a manner similar to sealing rails 15 described above. The second gas-carrying transition means 44 provides for cooling of heat generating components external to the machine frame, such a component being represented by way of example here as an electrical terminal box 48.

Also shown in FIG. 4 are apertures 54 and conduits 56 communicating with manifold 42 and manifold 40, respectively. Conduits 56 extend axially along the machine frame and communicate with the interior of the machine at selected axial stations. Conduits, similar to conduits 56, which communicate between the machine interior and mid-frame manifold 12 may be provided, or conduits 56 could be replaced by apertures leading directly to the interior of the machine, without departing from the spirit of the invention. Conduits leading into mid-frame manifold 12 would, of course, eliminate the need for apertures 8 in mid-frame section 2.

According to the present invention, warm cooling gas enters mid-frame manifold 12 from the interior of the dynamoelectric machine through apertures 8, or external conduits. From manifold 12, warm cooling gas is introduced into gas-carrying transition means 18 through aperture 20, passes through a heat exchanger to cool the warm cooling gas, and the cooled gas enters end-frame manifold 14 through aperture 22. The cooling gas is then drawn through aperture 9 into the interior of the machine by a fan (not shown) and is introduced into second end-frame manifold 42 through aperture 54. From manifold 42, the cooling gas enters second gas-carrying transition means 44 through aperture 51. Electrical terminal box 48 is exposed to cooling gas through aperture 50, and the cooling gas then enters second mid-frame manifold 40 through aperture 52. The cooling gas is then reintroduced to the interior of the machine by conduits 56.

Thus, it is seen that the present invention provides efficient cooling gas flow for a dynamoelectric machine while permitting the frame of the dynamoelectric machine to be made in sections to facilitate handling and shipping.

Although only one specific embodiment of the invention has been shown, those skilled in the art will perceive modifications other than those specifically pointed out which can be made without departing from the invention, and it is intended by the appended claims to cover all such modifications as fall within the true spirit and scope of the invention.

Having thus described the invention, the following is claimed.

What we claim as new and desire to secure by Letters Patent of the United States is:

1. A gas-cooled dynamoelectric machine comprising:

a. a mid-frame section;
   b. a separate end-frame section;
   c. an annular joint sealingly connecting the end-frame section to the mid-frame section;
   d. manifold means comprising:
      i. a separate mid-frame manifold sealingly connected to the mid-frame section and communicating with the interior of the dynamoelectric machine;
      ii. a separate end-frame manifold sealingly connected to the end-frame section and communicating with the interior of the dynamoelectric machine;
   e. a gas-carrying transition means for conveying cooling gas between the mid-frame manifold and the end-frame manifold, the gas-carrying transition means sealingly connected to the manifold means; and,
   f. sealing rails axially disposed between the mid-frame manifold and the end-frame manifold for sealing the transition means to the dynamoelectric machine.

2. The dynamoelectric machine recited in claim 1 wherein said gas-carrying transition means includes a heat exchanger.

3. The gas-cooled dynamoelectric machine recited in claim 1 further comprising:
   a. a second manifold means comprising:
      i. a second mid-frame manifold sealingly connected to said mid-frame section and communicating with the interior of the dynamoelectric machine, and
      ii. a second end-frame manifold sealingly connected to said end-frame section and communicating with the interior of the dynamoelectric machine, and
      iii. sealing rails sealingly connected to said second mid-frame manifold and said second end-frame manifold and to said mid-frame section and said end-frame section; and
   b. a second gas-carrying transition means for conveying cooling gas between said second mid-frame manifold and said second end-frame manifold, said second gas-carrying transition means being sealingly connected to said second manifold means.

4. The gas-cooled dynamoelectric machine recited in claim 2 further comprising:
   a. a second manifold means comprising:

i. a second mid-frame manifold sealingly connected to said mid-frame section and communicating with the interior of the dynamoelectric machine, and ii. a second end-frame manifold sealingly connected to said end-frame section and communicating with the interior of the dynamoelectric machine, and iii. sealing rails sealingly connected to said second mid-frame manifold and said second end frame manifold and to said mid-frame section and said end-frame section; and b. a second gas-carrying transition means for conveying cooling gas between said second mid-frame manifold and said second end-frame manifold, said second gas-carrying transition means being sealingly connected to said second manifold means and including an aperture for conveying cooling gas to heat-generating components external to the dynamoelectric machine.

5. The gas-cooled dynamoelectric machine recited in claim 4 further comprising conduit means for conveying cooling gas from said second mid-frame manifold to the interior of the dynamoelectric machine, said conduit means being mounted to the exterior of said mid-frame section.

* * * * *